Aug. 11, 1931.　　　W. H. PIERCE　　　1,818,272
ADAPTER FOR LUBRICATING APPARATUS
Filed May 20, 1929
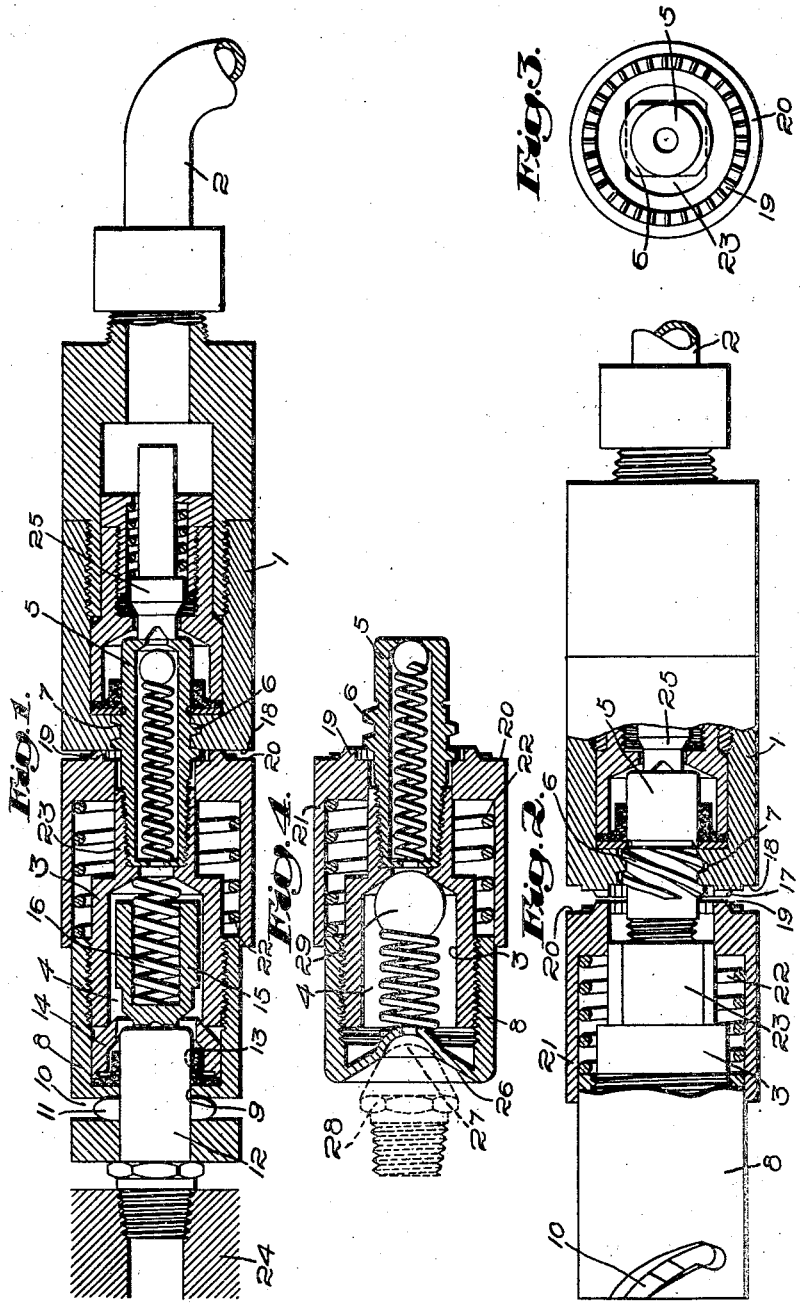
Inventor:
Walter H. Pierce
by Emery, Booth, Varney & Townsend
Attys.

Patented Aug. 11, 1931

1,818,272

UNITED STATES PATENT OFFICE

WALTER H. PIERCE, OF WATERTOWN, MASSACHUSETTS, ASSIGNOR, BY MESNE ASSIGNMENTS, TO ALEMITE CORPORATION, OF CHICAGO, ILLINOIS, A CORPORATION OF DELAWARE

ADAPTER FOR LUBRICATING APPARATUS

Application filed May 20, 1929. Serial No. 364,516.

My invention aims to provide improvements in lubricating apparatus and more particularly improvements in adapters for adapting a nozzle of a lubricant-dispensing device for cooperation with lubricant-receiving nipples of different types and construction.

In the drawings which illustrate preferred embodiments of my invention:—

Figure 1 is a longitudinal section through one form of my invention showing one end of an adapter attached to a nozzle and the other end attached to a lubricant-receiving nipple;

Fig. 2 is a part section and part elevation showing the manner in which the adapter may be removed from the nozzle;

Fig. 3 is an end view of the adapter which engages a nozzle; and

Fig. 4 is a section through an adapter which is adapted to engage a nipple like that shown in dotted lines.

Referring now to the embodiments of my invention illustrated by the drawings, I have shown various adapter means whereby the nozzle of a lubricant-dispensing device may be adapted to engage lubricant-receiving nipples which cannot be engaged by the nozzle itself.

For purposes of illustration, I have shown a nozzle 1 which is connected to a flexible hose 2 of a lubricant tank. (The tank is not shown and the hose 2 is broken off adjacent to the nozzle.) Any suitable nozzle may be used, but I have preferred to illustrate one which is substantially the same in construction and operation as the nozzle end of the device illustrated and described in United States Letters Patent No. 1,687,779, issued October 16, 1928.

The adapter which I have illustrated in Figs. 1, 2 and 3 has a central part 3 having a bore 4 through which lubricant may pass. To one end of the part 3 I have secured by a thread connection, a lubricant-receiving nipple 5 of a well known type having male threads 6 for coupling engagement with the female threads 7 of the nozzle 1. To the other end of the part 3 I have attached a coupling part 8 having a lubricant nipple-receiving opening 9 and provided with female slots 10 for receiving the pin portions 11 of another well known type of lubricant-receiving nipple 12. Between the parts 3 and 8 are secured in position a hat-shaped sealing washer 13 and a valve seat part 14. This seat part 14 provides a seat for the valve part 15 which is normally held against the seat by means of a spring 16.

To prevent accidental relative rotation between the adapter and the nozzle 1, I have provided interlocking means herein illustrated in the form of annularly arranged ratchet teeth 17, on the end face 18 of the nozzle 1, cooperating with similarly arranged teeth 19 located on the end face 20 of an axially movable sleeve 21 slidable with relation to the parts 3 and 8 and the nipple 5. The sleeve 21 is normally pressed toward the nipple 5 by means of a spring 22, as best illustrated in Fig. 1.

In assembling the parts of the adapter, the valve part 15, valve seat part 14, spring 16 and washer 13 are held together between the parts 3 and 8 and the sleeve 21 and spring 22 are held in place by means of the male threads 6 of the nipple 5, as shown in Fig. 2. The sleeve 21 is interlocked against rotation relative to the other parts of the adapter by the inter-engagement between the flat sided reduced portion 23 of the part 3 (Figs. 1 and 3) and the wall of the opening of the same cross-section, provided in the sleeve 21.

My invention is particularly useful in motor vehicle garages, factories and like places where various vehicles or machines having different types of lubricant-receiving nipples may be located and which must have their bearings lubricated from time to time. With my system of adapters it is possible to adapt a lubricating system for connection with any of the different types of nipples secured to bearings. The nozzle of the lubricant-discharge device is adapted for connection with a certain type nipple. If a different type nipple is to receive lubricant from the same compressor it is merely necessary to hold the nozzle 1 in one hand and the adapter in the other, then enter the nipple 5 in the opening 9 and turn one of the devices relative to the other to attach the adapter to the nozzle. During this turning operation the male threads 6 and female threads 7 will engage and the teeth 17 and 19 brought into interlocking engagement, as shown in Fig. 1. The nozzle 1 and adapter then form a rigid device in which there is no lost motion between them, because of the bearing engagement of the teeth 17 and 19.

With the adapter attached to a nozzle, as above described and as illustrated in Fig. 1, the nozzle part 8 of the adapter may be readily attached to the type of nipple 12 secured to the bearing 24. Thus attached, lubricant may pass through the nozzle 1 and by the valve 25, which was opened when the adapter was connected, and then through the adapter and by the valve part 15, which was opened by engagement of the adapter with the nipple 12, all as illustrated by Fig. 1.

If a third type of nipple is to be engaged by the lubricating apparatus a second adapter may be engaged with the first described adapter, or an adapter like that shown in Fig. 4, may be substituted for the one shown in Fig. 1.

In this instance, the adapters are the same in construction and operation, except that in the adapter shown in Fig. 4, the nozzle part 8 has a recessed end face 26 which is adapted to make a lubricant tight contact with the rounded end 27 of a nipple 28, shown in dotted lines. In this adapter the valve 29 is of the ball type which may be opened by the pressure of the lubricant.

When removing one adapter and attaching another the sleeve 21 must be moved axially against the spring 22 to disengage the teeth 17 and 19, as best shown in Fig. 2, and while held disengaged the adapter must be rotated to disengage the nipple 5 from connection with the nozzle 1.

The adapters which I have illustrated and described are simple, durable and efficient and when secured to a nozzle really become a part of the nozzle to the extent that it is rigidly locked therewith and can be engaged with and disengaged from a nipple without effecting the operation of the lubricant-discharging apparatus with which it may be used.

While I have illustrated and described particular embodiments of my invention, I do not wish to be limited thereby because the scope of my invention is best defined by the following claims.

Claims:

1. In combination with the discharge nozzle of a lubricant-dispensing device, an adapter having a male part at one end cooperating with the female part of the nozzle to secure the adapter to the nozzle and lubricant nipple-engaging means at the other end for engagement with a nipple of a type differing from the type adapted to be engaged by the said nozzle, said nozzle having an end face having means cooperating with means presented by an end face of the adapter to lock the adapter and nozzle against accidental relative rotation.

2. In combination with the discharge nozzle of a lubricant-dispensing device, an adapter having a male part at one end cooperating with the female part of the nozzle to secure the adapter to the nozzle, lubricant nipple-engaging means at the other end for engagement with a nipple of a type differing from the type adapted to be engaged by the said nozzle, said nozzle having an end face having means cooperating with means presented by an end face of the adapter to lock the adapter and nozzle against accidental relative rotation and means operable to permit disengagement of the interlocking means presented at the two faces to permit disengagement of the adapter from the nozzle.

3. In combination with the discharge nozzle of a lubricant dispensing device, an adapter having a male part at one end cooperating with the female part of the nozzle to secure the adapter to the nozzle, lubricant nipple-engaging means at the other end for engagement with a nipple of a type differing from the type adapted to be engaged by the said nozzle, said nozzle having an end face having means cooperating with means presented by an end face of the adapter to lock the adapter and nozzle against accidental relative rotation and axially movable means operable to permit disengagement of the interlocking means presented at the two faces to permit disengagement of the adapter from the nozzle.

4. In combination with the discharge nozzle of a lubricant-dispensing device, an adapter having a male part at one end cooperating with the female part of the nozzle to secure the adapter to the nozzle, lubricant nipple-engaging means at the other end for engagement with a nipple of a type differing from the type adapted to be engaged by the said nozzle, a part of said nozzle having an end face, a part of said adapter having an end face facing toward the end face of the nozzle part and a series of serrations presented at the end face of each of said parts and each interlocking with the other to prevent rotation of one part relative to the other in one direction.

5. In combination with the discharge nozzle of a lubricant-dispensing device, an adapter having a male part at one end cooperating with the female part of the nozzle to secure the adapter to the nozzle, lubricant nipple-engaging means at the other end for engagement with a nipple of a type differing from the type adapted to be engaged by the said nozzle, a part of said nozzle having an end face, a part of said adapter having an end face facing toward the end face of the nozzle part, a series of serrations presented at the end face of each of said parts and each interlocking with the other to prevent rotation of one part relative to the other in one direction and one of said parts being axially movable relative to the other part to permit disengagement of the serrations.

6. In combination with the discharge nozzle of a lubricant-dispensing device, an adapter having a male part at one end cooperating with the female part of the nozzle to secure the adapter to the nozzle, lubricant nipple-engaging means at the other end for engagement with a nipple of a type differing from the type adapted to be engaged by the said nozzle, a part of said nozzle having an end face, a part of said adapter having an end face facing toward the end face of the nozzle part, a series of serrations presented at the end face of each of said parts and each interlocking with the other to prevent rotation of one part relative to the other in one direction and the part of said adapter which presents said end face being axially movable relative to the other part to permit disengagement of the serrations.

7. In combination with the discharge nozzle of a lubricant-dispensing device, an adapter having a male part at one end cooperating with the female part of the nozzle to secure the adapter to the nozzle, lubricant nipple-engaging means at the other end for engagement with a nipple of a type differing from the type adapted to be engaged by the said nozzle, said nozzle having an end face having means cooperating with means presented by an end face of the adapter to lock the adapter and nozzle against accidental relative rotation and axially movable spring-pressed sleeve means operable to permit disengagement of the interlocking means presented at the two faces to permit disengagement of the adapter from the nozzle.

8. In combination, an adapter and a lubricant apparatus discharge nozzle secured together by male and female means, teeth 17 and 19 inter-engaging between end faces 18 and 20 of the adapter and nozzle to prevent accidental relative rotation and an axially movable sleeve 21 provided on the adapter and carrying the teeth 19 whereby the teeth 19 may be disengaged from the teeth 17 to permit removal of the adapter from the nozzle.

9. An adapter, for use in connecting the nozzle of a lubricant-dispensing device with a nipple of different construction than the nipple with which the nozzle is adapted to cooperate, comprising a device having a male part at one end for engagement with a nozzle and female means at the other end for engagement with a lubricant-receiving nipple, an axially movable sleeve forming a part of the adapter and means carried by the sleeve for interlocking engagement with cooperating means provided by the said nozzle.

10. An adapter, for use in connecting the nozzle of a lubricant-dispensing device with a nipple of different construction than the nipple with which the nozzle is adapted to cooperate, comprising a device having a part provided with a bore through which lubricant may pass, a lubricant-receiving nipple secured to said part and communicating with said bore, a sleeve rigidly secured to said part and having means for co-operative engagement with a lubricant-receiving nipple attached to a part to be lubricated, a second sleeve assembled for axial movement relative to the said part carrying the lubricant-receiving nipple, said second sleeve having means for interlocking engagement with cooperating means presented by a nozzle.

11. An adapter, for use in connecting the nozzle of a lubricant-dispensing device with a nipple of different construction than the nipple with which the nozzle is adapted to cooperate, comprising a device having a part provided with a bore through which lubricant may pass, a lubricant-receiving nipple secured to said part and communicating with said bore, a sleeve rigidly secured to said part and having means for cooperative engagement with a lubricant-receiving nipple attached to a part to be lubricated, a second sleeve assembled for axial movement relative to the said part carrying the lubricant-receiving nipple, said second sleeve having means for interlocking engagement with cooperating means presented by a nozzle and a spring normally pressing said second mentioned sleeve in a direction away from said first mentioned sleeve.

12. An adapter, for use in connecting the nozzle of a lubricant-dispensing device with a nipple of different construction than the nipple with which the nozzle is adapted to cooperate, comprising a device having a part provided with a bore through which lubricant may pass, a lubricant-receiving nipple secured to said part and communicating with said bore, a sleeve rigidly secured to said part and having means for cooperative engagement with a lubricant-receiving nipple attached to a part to be lubricated, a second sleeve assembled for axial movement relative to the said part carrying the lubricant-receiving nipple, said second sleeve having an annular series of teeth on its end face for interlocking engagement with cooperating means presented by a nozzle.

13. An adapter, for use in connecting the nozzle of a lubricant-dispensing device with a nipple of different construction than the nipple with which the nozzle is adapted to cooperate, comprising a device having a part provided with a bore through which lubricant may pass, a lubricant-receiving nipple secured to said part and communicating with said bore, a sleeve rigidly secured to said part and having means for cooperative engagement with a lubricant-receiving nipple attached to a part to be lubricated, a second sleeve assembled for axial movement relative to the said part carrying the lubricant-receiving nipple, said second sleeve having means for interlocking engagement with cooperating means presented by a nozzle, said nipple secured to the said part having a portion passing through an opening in the end of said second sleeve and the said portion having male projections extending from the periphery thereof and bearing against the end face of said second sleeve to hold the sleeve in assembled relation with the other parts of the adapter.

In testimony whereof, I have signed my name to this specification.

WALTER H. PIERCE.